Jan. 25, 1966  H. R. FEHLING ETAL  3,230,935
NIBS FOR BALL POINT WRITING INSTRUMENTS
Filed Oct. 10, 1960  5 Sheets-Sheet 1
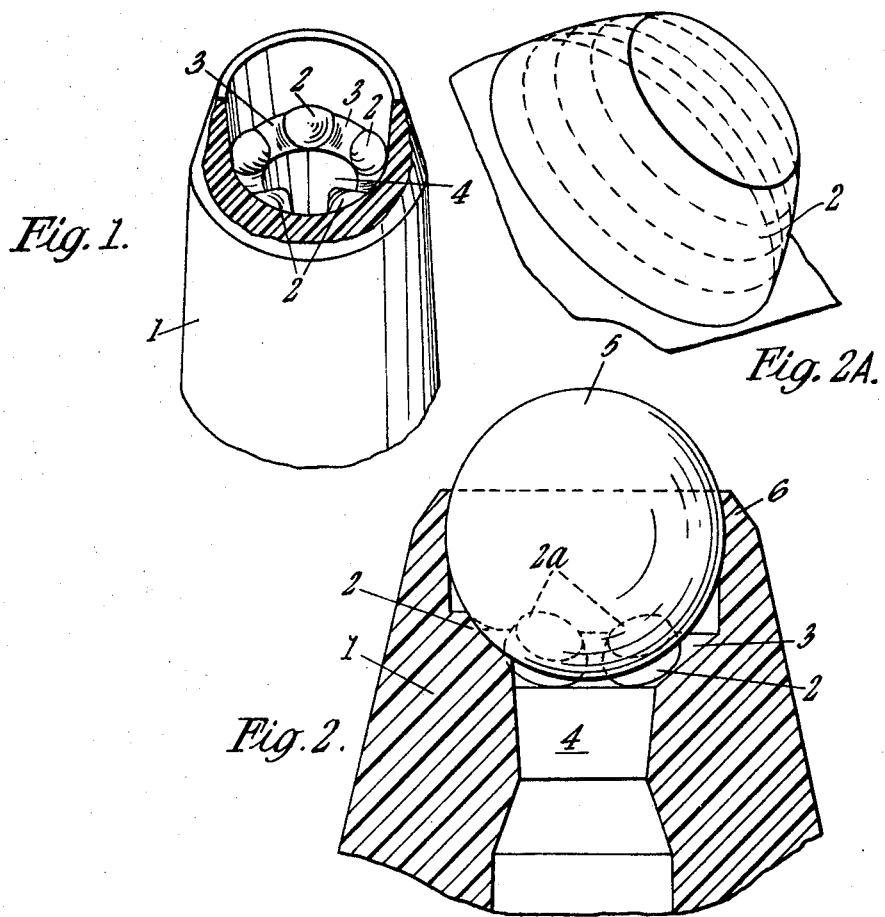
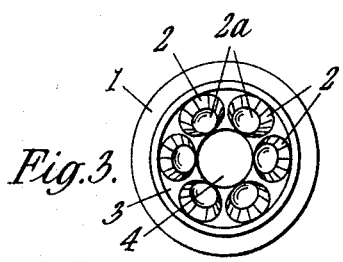
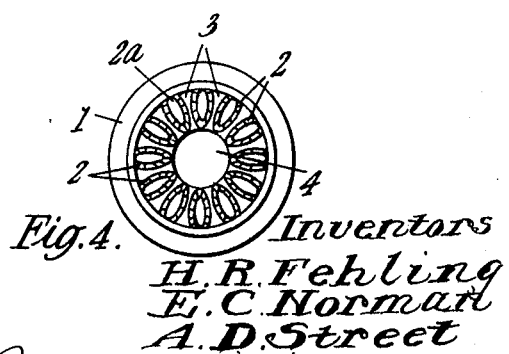
Inventors
H. R. Fehling
E. C. Norman
A. D. Street Inventors
H. R. Fehling
E. C. Norman
A. D. Street
By Brumbaugh, Free, Graves & Donohue Attys Jan. 25, 1966   H. R. FEHLING ETAL   3,230,935
NIBS FOR BALL POINT WRITING INSTRUMENTS
Filed Oct. 10, 1960   5 Sheets-Sheet 3

Inventors
H. R. Fehling
E. C. Norman
A. D. Street
By Brumbaugh, Free, Graves & Donohue Attys.

Jan. 25, 1966 H. R. FEHLING ETAL 3,230,935
NIBS FOR BALL POINT WRITING INSTRUMENTS
Filed Oct. 10, 1960 5 Sheets-Sheet 4

INVENTORS.
H. R. FEHLING,
E. C. NORMAN &
BY A. D. STREET

Brumbaugh, Free, Graves & Donohue
their ATTORNEYS

Jan. 25, 1966 H. R. FEHLING ETAL 3,230,935
NIBS FOR BALL POINT WRITING INSTRUMENTS
Filed Oct. 10, 1960 5 Sheets-Sheet 5

INVENTORS.
H. R. FEHLING,
E. C. NORMAN &
A. D. STREET
BY
Brumbaugh, Free, Graves & Donohue
their ATTORNEYS United States Patent Office
3,230,935
Patented Jan. 25, 1966

3,230,935
NIBS FOR BALL POINT WRITING INSTRUMENTS
Hans Reinhard Fehling, Eric Charles Norman, and Alfred Dennis Street, London, England, assignors to I.R.C. Limited, London, England, a company of Great Britain
Filed Oct. 10, 1960, Ser. No. 61,562
Claims priority, application Great Britain, Aug. 6, 1957, 24,751/57
6 Claims. (Cl. 120—42.4)

This invention relates to writing extremities or "nibs" for ball point writing instruments and, more particularly, to a new and improved ball point nib and the manufacture thereof.

This application is a continuation-in-part of the United States application of Fehling, Norman and Street Serial Number 752,615 filed August 1, 1958, now abandoned, for "Writing Instruments and Parts Thereof."

Generally, nibs for ball point writing instruments comprise a housing formed with a ball-receiving socket and having a writing ball rotatably supported in and partly protruding therefrom, and, as used herein, the term "nib" refers to a housing with or without the writing ball. Ink from a reservoir within the instrument is supplied to the ball through an ink feed duct which leads to the base of the socket so that as the ball is rotated in its socket by being moved in contact with a surface, such as a sheet of paper, a thin film of ink is carried by the ball through the narrow gap between it and the housing and this is deposited as a trace on the paper.

It is well known that the nib of a ball point pen cannot function properly unless the socket is made with several part-spherical seats at the base of the socket surrounding the ink feed duct and with ink channels between them, an uninterrupted part-spherical lateral seat encircling the ball about its equator (considering the area of the ball at the base of the socket as its lower pole), and an annular ink groove encircling the ball between the lateral seat and the base seats so that it communicates with the ink feed duct through all the channels disposed between the base seats. Preferably, the surface of the lateral seat extends below as well as above the ball equator and, in this case, the annular groove lies entirely about the lower hemisphere of the ball. Furthermore, the entire socket, which has an internal diameter of about one millimeter, must be made from a single piece of solid material so that all the base seats and the lateral seats are formed on the same member and a uniform clearance of one to ten microns between the ball and its spherical seating surfaces must be maintained.

Heretofore these requirements have been met either by subjecting each nib blank to a succession of intricate machining or punching oprations to form the desired socket structure or by producing complementary surfaces in a die member by precision grinding and lapping and then casting or molding the nib about the die. In both instances the formation of the base seats and adjacent ink channels in the ball socket has been particularly difficult and the resulting structures have not been entirely satisfactory. Sockets made in this manner have, in general, been characterized by the provision of an ink feed duct opening of polygonal cross-section at the base of the socket so that the base seats for the barrel are formed by the sides of the polygon and, therefore, are located immediately adjacent to the ink feed channels at the corners of the polygon. This arrangement severely restricts the number and size of the base seats and also the capacity of the intermediate ink channels leading to the annular groove. Moreover, other types of nibs having ink feed ducts provided with angularly spaced longitudinal grooves in an attempt to permit ink to pass directly to the annular groove in the socket present the same problems.

Accordingly, it is an object of the present invention to provide a new and improved nib for ball point writing instruments which obviates the disadvantages of the prior art.

An additional object of the invention is to provide a new and improved nib for ball point writing instruments having a relatively large number of base seats in the ball-receiving socket while at the same time providing a corresponding number of intermediate ink passages of substantial capacity leading from a central ink feed duct to a peripheral groove encircling the writing ball.

Another object of the present invention is to provide a new and improved core member for use in forming a nib of the above character.

A further object of the invention is to provide a novel method for preparing a core member adapted for use in making nibs for ball point writing instruments.

These and other objects of the invention are attained by making the nib socket with an outwardly flaring, generally conical surface portion leading from the wall of the ink feed duct to the annular groove in the socket and forming a plurality of mounds in the flaring surface portion which are integral with the nib housing. In one embodiment of the invention a single circle of these mounds surrounds the ink feed duct while in another embodiment two circles of mounds are disposed on the conical surface at different radial and longitudinal distances from the terminus of the ink feed duct.

In order to form the nib socket for a ball point writing instrument in the above manner, a core member having complementary shaped surfaces is utilized. To this end, the invention encompasses the provision of a core pin having a generally cylindrical portion adapted to form the sides of the ball-receiving socket, and a generally conical portion having a surface flaring inwardly from one end of the cylindrical portion and formed with a series of angularly spaced concave depressions so that a corresponding series of base seat mounds is formed in the socket of a nib made with the core pin.

In order to produce these concave depressions or cavities in the core pin with a high degree of precision, the conical surface of the core pin is eroded at each cavity location with an eroding tool, the pin being rotated about its axis through a predetermined angle relative to the tool between each pair of eroding operations. The eroding tool may be of either the mechanical or the electrical type but it preferably comprises an electrode arranged to apply a succession of electrical sparks of regulated magnitude to the conical surface of the core pin at each angular location. Moreover, the electrode may also be rotated about its own axis during the sparking operation to assure uniformity of the cavity surface and, in addition, the electrode may be oriented at any of a plurality of angles with respect to the axis of the core pin to produce any of a variety of cavity shapes resulting in a corresponding variety of base seat mound shapes in the nib socket produced by the core pin. In one case, the electrode is positioned substantially perpendicularly to the conical pin surface so as to produce approximately circular cavities while, with another arrangement, the electrode is held substantially parallel to the axis of the core pin but radially spaced therefrom to provide longitudinally elongated cavities in the conical pin surface.

Further objects and advantages of the invention will be apparent from a reading of the following description in conjunction with the accompanying drawings in which:

FIG. 1 is a perspective view with a portion cut away of a typical nib for a ball point writing instrument prepared according to the invention;

FIG. 2 is a view in partial longitudinal section of the nib shown in FIG. 1 with a writing ball inserted in the socket;

FIG. 2A is an enlarged fragmentary view illustrating the structure of a base seat mound shown in FIG. 2;

FIG. 3 is a plan view of the nib illustrated in FIG. 1 showing one form of base seat construction;

FIG. 4 is a plan view of another nib, prepared in accordance with the invention, illustrating a different form of base seat construction;

Figure 5:
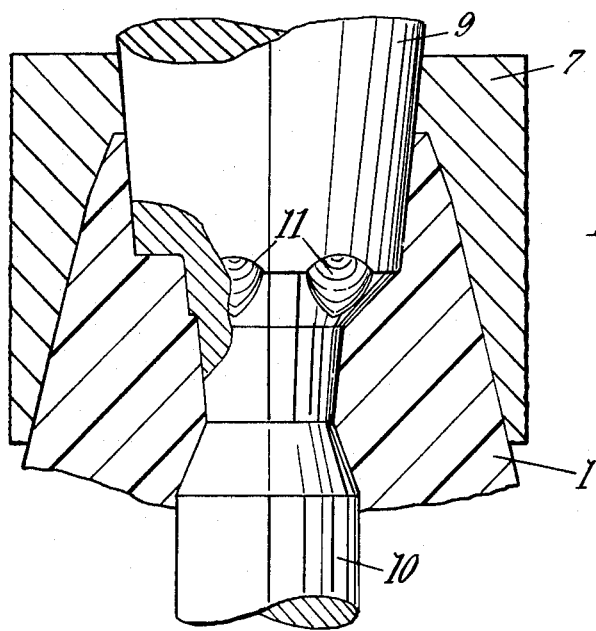
FIG. 5 is a partial sectional view showing the formation of a nib with the novel core pin of the invention.

In the embodiment of the invention shown in FIGS. 1 and 2, a nib 1 for a ball point writing instrument is formed with a central ink feed duct 4 and a ball-receiving socket including at its base a generally conical surface flaring outwardly from the ink feed duct having thereon a circular series of spaced mounds or projections 2, which are integral with the nib body, thereby forming a corresponding number of intermediate spaces 3 so as to provide a plurality of ink channels leading from the duct 4 to a peripheral groove encircling a ball 5 inserted in the socket. The mounds 2, being spaced longitudinally and radially along the conical surface from the terminus of the ink duct 4, can be relatively large in number and size while, at the same time, permitting a corresponding number of ink passages or channels of substantial capacity formed by the spaces 3 between the conical surface, the mounds, and the writing ball 5.

The nib 1 is made of a permanently deformable material, such as tin alloy, or nylon, so that when the writing ball 5, or a correspondingly shaped die member, is inserted into the socket with sufficient pressure and, if necessary, heat, the apex of each of the mounds 2 is deformed to produce a part-spherical bearing surface 2a conforming to the shape of the writing ball. FIG. 2A shows that each mound 2 has a decreasing cross-sectional area in planes parallel to but successively farther away from the conical surface from which the mounds project. As best seen in the plan view of FIG. 3, which shows the socket with the writing ball removed, this operation produces a circular series of smooth bearing surfaces of substantial area about the ink feed duct adapted to provide support for the ball at the base of the socket while, at the same time, holding it away from the terminus of the ink duct 4. In addition, the rim 6 of the nib socket is deformed in a similar manner, such as by peining, so that it forms a part-spherical lateral ball seat encircling the ball and the forward lip of the rim retains the ball in the socket.

Although FIGS. 1–3 depict mounds or projections 2 of generally circular cross-section, it will be appreciated that other suitable mound configurations, which may be produced in the manner described hereinafter, are capable of providing all the advantages of the invention. Thus, for example, as shown in FIG. 4, the mounds or projections 2 may be elongated radially so that the part-spherical bearing surface 2a at the top of each mound is of a generally elliptical shape. Moreover, these bearing surfaces may be either preformed before the writing ball is inserted in the socket or the mounds may be deformed to produce the surfaces when the writing ball is inserted and retained in position in the socket. It will be readily apparent that any suitable ratio of the width of the ink channels which are formed by the spaces 3 to the area of the part-spherical ball seat surfaces 2a can be obtained by selecting an appropriate mound size and shape and a particular radial location of the mounds on the conical surface at the base of the socket.

In order to form a nib having base seat mounds of the type shown in FIGS. 1–3, two co-axial core pins 9 and 10 are used in the manner illustrated in FIG. 5. In this example, a mold member 7 is shaped to surround and form the outer surface of the nib while the core pin 10 is centrally located and forms the main part of the ink feed duct described above. The other core pin 9, which forms the nib socket and the terminus of the ink feed duct, is inserted through an opening in the mold member 7 and disposed in abutting relation with the pin 10, both the core pins being made with the necessary "draw" or inclination of their side walls to facilitate withdrawal after the nib has been formed. With the mold thus assembled, a suitable nib material, such as tin alloy, or nylon, is injected into the mold cavity in a molten state in a die-casting or injection molding operation to form the nib 1.

As illustrated in FIG. 5 the core pin 9 comprises a generally cylindrical portion of relatively large diameter adapted to form the side wall of the ball-receiving socket of the nib, a smaller diameter portion adapted to form the terminus of the ink feed duct, and a conical portion having a surface joining the ends of the large and small diameter portions. Moreover, in order to produce the base seat mounds 2, shown in FIGS. 1–3, the core pin includes a circular series of angularly spaced cavities or depressions in the conical surface of the pin and, in the example shown in FIG. 5, these cavities also extend into the large diameter pin portion. It will be noted that the cavities, which may be located along the conical surface portion at any selected radial and longitudinal distance from the small diameter pin portion, are formed with sufficient inclination of their side walls to permit ready withdrawal of the pin 9.

Inasmuch as the core pin 9 is of minute dimensions, being approximately one millimeter in diameter in the larger portion, it will be appreciated that the cavities 11 cannot be made conveniently and accurately with conventional die forming equipment, such as grinding wheels. Accordingly, one preferred method for forming the cavities is the spark erosion process illustrated schematically in FIG. 6 in which the pin is mounted for indexing about its axis and each depression in the pin is formed by applying a series of sparks of selected intensity between the conical portion of the pin 9 and an adjacent electrode 15.

Figure 6:
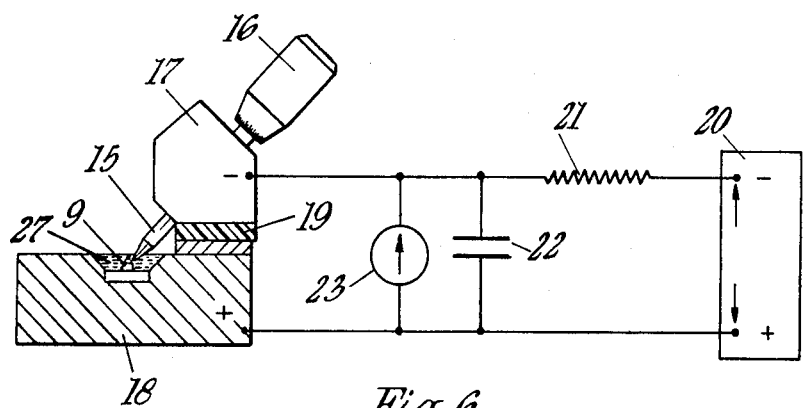
FIG. 6 is a schematic view illustrating one method of preparing the core pin of FIG. 5.

In FIG. 6, the upper part 17 of the illustrated apparatus comprises an electrode support block providing a micrometer feed 16 for the electrode 15 and the apparatus also includes a base member 18, which is electrically insulated from the support block by an insulating layer 19. Within a hollow in the base member 18, the core pin 9 and the adjacent tip of the electrode 15 are immersed in a pool of liquid dielectric 27, such as paraffin oil, and the pin is supported for rotation with respect to the electrode 15. In order to apply a regulated series of eroding sparks to the pin 9, the negative terminal of an adjustable D.C. voltage supply 20 is connected to the electrode 15 through the support block 17 and a charging resistor 21 while the positive terminal of the supply is connected to the base member 18. In addition, a condenser 22 having a capacitance of less than 0.1 microfarad and preferably as low as 0.01 microfarad and a voltmeter 23 are connected in parallel between the block 17 and the base member 18. For strong sparks producing relatively coarse cuts in the core pin 9, the D.C. supply is preferably set at about 40 volts while, for the fininshing cuts, a lower supply voltage of 25 volts, for example, may be used. With this arrangement a circle of cavities having adjacent edges less than 0.002 inch apart can be formed in a one millimeter core pin with relative ease and high precision in spite of the delicacy and fineness of the operation.

Figure 8:
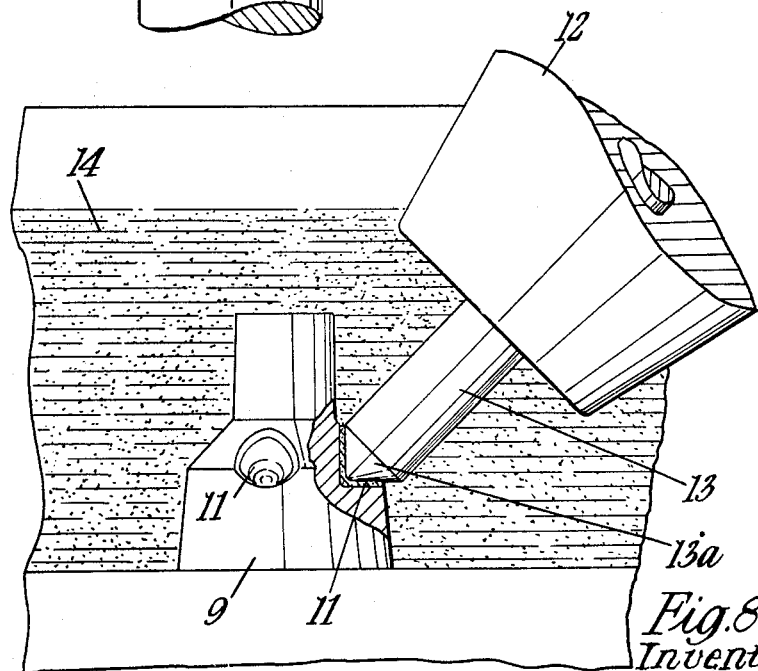
FIG. 8 is an enlarged view of a portion of the apparatus shown in FIG. 7.
Figure 7:
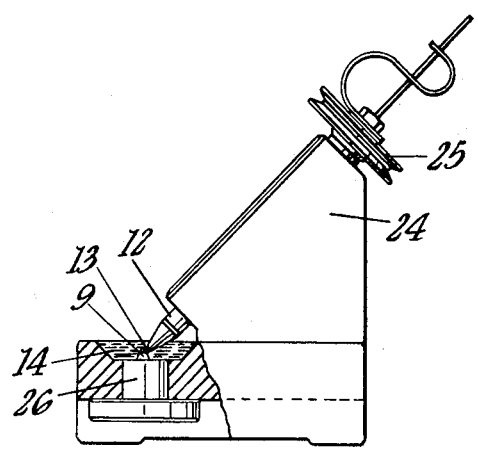
FIG. 7 is a partial sectional view illustrating another method of preparing a core pin.

Another method of producing the depressions is illustrated in FIGS. 7 and 8. In this instance, the eroding tool is a rotating needle 13 made of hard brass, for example, having a conical tip 13a engaging the core pin 9, the needle 13 in the pin 9 being submerged in a suitable abrasive 14, preferably diamond paste. A suitable support stand 24 supports the quill 12 at the desired orientation with respect to the axis of the pin 9 and the quill, which may be axially adjustable in the stand, carries a pulley 25 arranged to receive a driving force to rotate the quill and its needle. In addition, the core pin 9 is removably affixed to a rotatable mounting 26 adapted to permit indexing of the pin after the formation of each depression 11. If desired, the quill 12 and the needle 13 can be reciprocated axially in the stand 24 by a suitable ultrasonic device, rather than being rotated, so that the cavities 11 are eroded by percussion.

Figure 9:
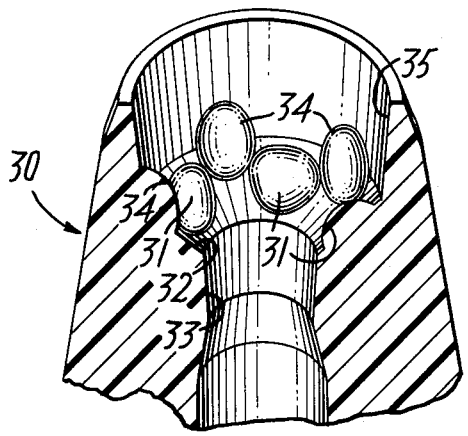
FIG. 9 is a perspective view, partly in section, showing another form of nib prepared in accordance with the invention.
Figure 10:
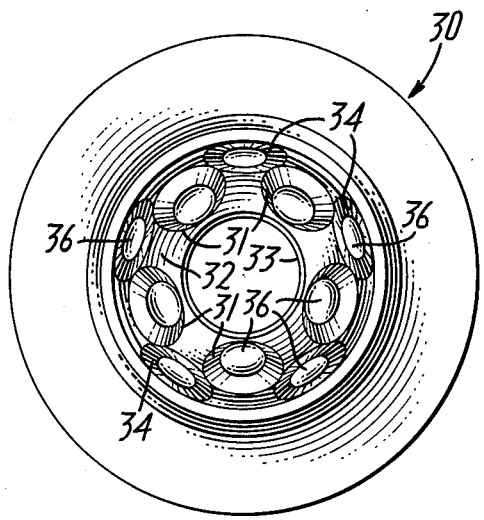
FIG. 10 is a plan view of the nib illustrated in FIG. 9.

According to a further embodiment of the invention, a relatively large total base seat surface area is provided in a nib socket while, at the same time, maintaining a substantial capacity in the ink channels leading from the feed duct to the annular groove of the socket by providing two banks or circles of mounds in the base of the socket. Thus, as illustrtaed in FIGS. 9 and 10, a typical nib 30 prepared in this manner has one bank of five base seat mounds 31 formed in the conical surface portion 32 adjacent to the terminus of the ink feed duct 33 and a second bank of five base seat mounds 34 formed near the junction of the conical surface portion 32 and the inner wall 35 of the socket. For convenience, the mounds 34 are preferably disposed at angular locations intermediate those of the mounds 31, each of the mounds being deformed in the manner described above to provide a part-spherical bearing surface 36.

Figure 11:
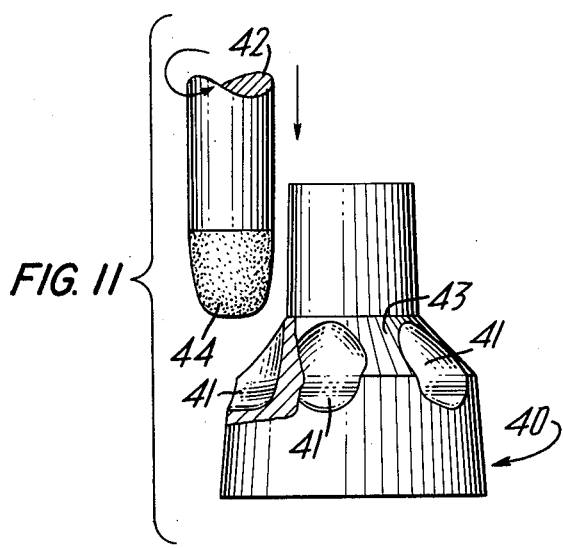
FIG. 11 illustrates another method for preparing a core pin in accordance with the invention.
Figure 12:
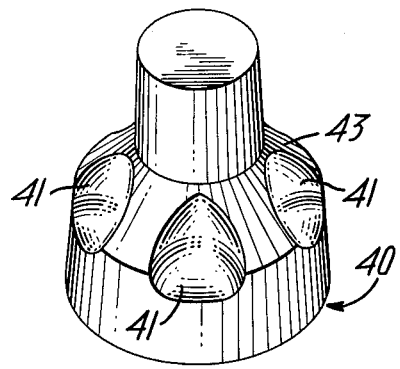
FIG. 12 is a perspective view showing a core pin made in the manner illustrated in FIG. 11.

As previously mentioned, the shape of the base seat mounds may be varied to produce other configurations by changing the orientation of the eroding tool with respect to the axis of the core pin or modifying the contour of the tip of the eroding tool. In the example shown in FIGS. 11 and 12, a core pin 40 is provided with a plurality of radially elongated cavities 41 so asto produce correspondingly elongated mounds with the pin by directing an eroding tool 42 against the conical pin surface 43 in an orientation parallel to the axis of the pin but spaced laterally therefrom. After each cavity is made, the pin 40 is rotated through a predetermined angle with respect to the tool 42, which is preferably an electrode turning about its own axis, as indicated by the arrow in the drawing, to assure uniformity of cavity formation. It will be observed that the relatively blunt tip 44 of the electrode 42 results in a cavity having a generally triangular periphery, the base of the triangle being formed by the blunt tip of the electrode.

Figure 13:
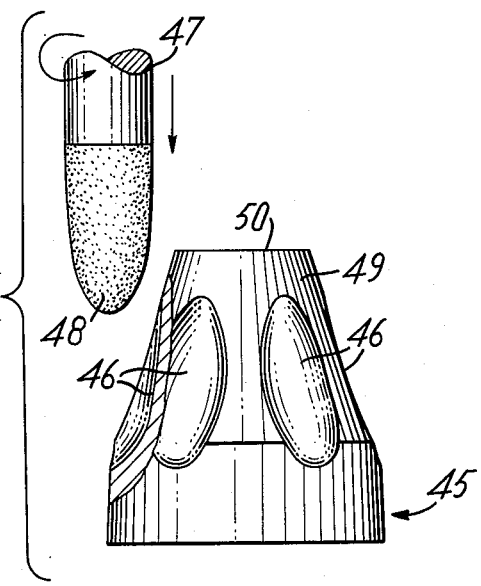
FIG. 13 is a view showing the preparation of another form of core pin.
Figure 14:
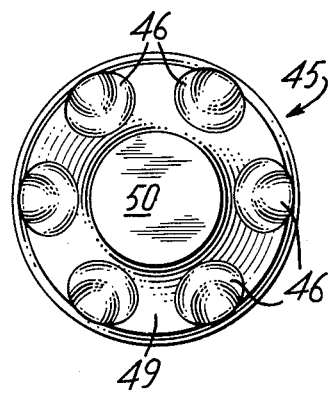
FIG. 14 is a plan view of a core pin made in the manner shown in FIG. 13.

On the other hand, a core pin 45 with elongated cavities 46 having a generally oval or elliptical periphery can be made, as shown in FIGS. 13 and 14, by using a rotating eroding tool 47 having a rounded tip 48 and moving it against the conical pin surface 49 in an orientation parallel to the axis of the pin. As illustrated in FIGS. 13 and 14, the core pin 45 may be made, if desired, with only the large diameter portion and the conical portion without any small diameter portion and, in this case, the other core pin abuts the small end 50 of the conical portion to form the terminus of the ink feed duct.

Figure 15:
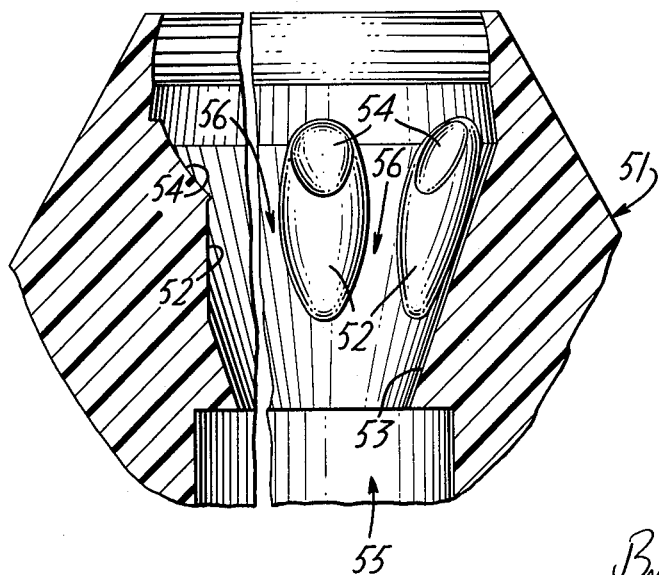
FIG. 15 is a view in longitudinal section showing the socket of a nib prepared with the core pin illustrated in FIG. 14.

In FIG. 15 a typical nib 51 made with a core pin of this type is illustrated in longitudinal cross-section. From this view it will be readily apparent that the elongated mounds 52 formed on the conical nib surface 53 by the cavities 46 of the pin 45 can be deformed to provide part-spherical base seating surfaces 54 which are radially and longitudinally spaced by a substantial distance from the terminus of the ink feed duct 55, thereby providing a plurality of ink channels of large capacity in the spaces 56 between the mounds.

Figure 16:
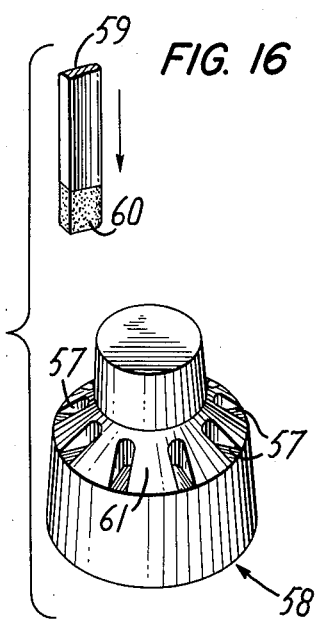
FIG. 16 is a view showing the preparation of still another form of core pin.

In certain instances it may be preferable to provide mound configurations which are not bounded by surfaces of revolution as occurs when the core pin cavities are made with rotating eroding tools. To this end, as shown in FIG. 16, a plurality of cavities 57 may be made in a pin 58 by moving a non-rotating electrode 59, having a tip 60 of any desired shape, against the conical surface 61 of the pin. In the typical example shown in FIG. 16, the electrode 59 has an elongated cross-section with a rounded edge adjacent to the pin axis and this electrode is moved against the conical surface 61 in a direction parallel to the axis of the pin.

Although the invention has been described herein with reference to specific embodiments, many modifications and variations therein will readily occur to those skilled in the art. Accordingly, all such variations and modifications are included within the intended scope of the invention as defined by the following claims.

We claim:
1. A nib for a ball point writing instrument comprising a housing formed with a ball-receiving socket having a writing ball mounted therein so as to enclose the rear surface portion of the writing ball, the socket having an annular side wall of approximately the same diameter as the writing ball surrounding the writing ball and extending rearwardly from the ball into the socket interior, the housing being formed with an internal ink feed duct leading to the interior of the socket, the socket also including an outwardly flaring surface extending from the terminus of the ink feed duct to the side wall of the socket so as to provide an annular groove encircling the enclosed surface of the writing ball, and a plurality of base seat mounds formed on the outwardly flaring surface and integral with the housing, each mound projecting upwardly from the outwardly flaring surface toward the enclosed ball surface and having a decreasing cross-sectional area in planes parallel to but successively farther from the outwardly flaring surface and terminating in a part-spherical seating surface adjacent to the writing ball to provide support therefor, the base seat mounds being angularly disposed at intervals about the terminus of the ink feed duct to hold the ball away from the outwardly flaring surface and to provide a plurality of ink channels bounded by the outwardly flaring surface and the surfaces of the ball and the mounds to permit ink to flow between the mounds from the ink feed duct to the annular groove and the side wall of the socket.

2. A nib for a ball point writing instrument according to claim 1 wherein the surface of each of the mounds is a surface of revolution and the mounds are of generally circular cross-section.

3. A nib for a ball point writing instrument according to claim 1 wherein each of the mounds is elongated in the radial direction from the nib axis along the outwardly flaring surface at the base of the socket.

4. A nib for a ball point writing instrument according to claim 1 wherein the plurality of base seat mounds is disposed in two circular arrays on the outwardly flaring surface about the terminus of the ink feed duct, one of the arrays being farther from the terminus than the other and having its mounds located at angular positions intermediate those of the mounds in the other array.

5. A nib for a ball point writing instrument according to claim 1 wherein the top of each of the mounds is deformed to provide said part-spherical seating surface for a ball received in the nib socket, all the part-spherical seating surfaces being formed with substantially the same radius directed from a point near the center of the socket.

6. A nib housing for a ball point writing instrument comprising a housing formed with a ball-receiving socket adapted to receive a writing ball therein so as to enclose the rear surface portion of a writing ball receivable in the socket, the socket having an annular side wall of approximately the same diameter as a writing ball to surround a writing ball receivable in the socket and extending rearwardly from the intended location of a ball into the socket interior, the housing being formed with an internal feed duct leading to the interior of the socket, the socket also including an outwardly flaring surface extending from the terminus of the ink feed duct to the side wall of the socket so as to provide an annular groove encircling the enclosed surface of a writing ball receivable in the socket, and a plurality of base seat mounds formed on the outwardly flaring surface and integral with the housing, each mound projecting upwardly from the outwardly flaring surface toward the enclosed surface of a ball receivable in the socket and having sides which slope inwardly toward an apex so as to initially provide a substantially point contact with a ball insertable in the socket, the apex of each base seat mound being permanently deformable upon insertion of a ball to form a part-spherical seating surface adjacent to a writing ball to provide support therefor, the base seat mounds being angularly disposed at intervals about the terminus of the ink feed duct to hold a ball receivable in the socket away from the outwardly flaring surface and to provide a plurality of ink channels bounded by the outwardly flaring surface and the surfaces of a ball receivable in the socket and the mounds to permit ink to flow between the mounds from the ink feed duct to the annular groove and the side wall of the socket.

References Cited by the Examiner

UNITED STATES PATENTS

| | | | |
|---|---|---|---|
| 2,079,393 | 5/1937 | Berge | 18—45 |
| 2,536,124 | 1/1951 | Bolvin et al. | 120—42.4 |
| 2,559,621 | 7/1951 | Hill | 51—289 |
| 2,602,191 | 7/1952 | Joy | 18—45 |
| 2,660,151 | 11/1953 | Smith et al. | 120—42.4 |
| 2,813,513 | 11/1957 | Seyer | 120—42.4 |
| 2,869,295 | 1/1959 | Naumann | 51—289 |
| 2,879,586 | 3/1959 | Fehling et al. | 120—42.4 X |
| 2,911,949 | 11/1959 | Beckwith | 120—42.4 |
| 2,967,353 | 1/1961 | Arengo | 120—42.4 X |

FOREIGN PATENTS

| | | |
|---|---|---|
| 204,379 | 11/1956 | Australia. |
| 1,212,583 | 10/1959 | France. |
| 660,784 | 11/1951 | Great Britain. |

EUGENE R. CAPOZIO, *Primary Examiner.*

GEORGE A. NINAS, JR., LEONARD W. VARNER, JEROME SCHNALL, *Examiners.*